United States Patent
McKean et al.

(10) Patent No.: US 9,348,525 B2
(45) Date of Patent: May 24, 2016

(54) SYSTEMS AND METHODS FOR A STORAGE ARRAY-MANAGED INITIATOR CACHE

(71) Applicant: NetApp, Inc., Sunnyvale, CA (US)

(72) Inventors: Brian D. McKean, Longmont, CO (US); Dennis Hahn, Wichita, KS (US)

(73) Assignee: NETAPP, INC., Sunnyvale, CA (US)

(*) Notice: Subject to any disclaimer, the term of this patent is extended or adjusted under 35 U.S.C. 154(b) by 153 days.

(21) Appl. No.: 14/186,557

(22) Filed: Feb. 21, 2014

(65) Prior Publication Data
US 2015/0242138 A1    Aug. 27, 2015

(51) Int. Cl.
*G06F 11/00*    (2006.01)
*G06F 3/06*    (2006.01)
*G06F 11/14*    (2006.01)
*G06F 11/20*    (2006.01)

(52) U.S. Cl.
CPC .............. *G06F 3/0619* (2013.01); *G06F 3/061* (2013.01); *G06F 3/067* (2013.01); *G06F 3/0655* (2013.01); *G06F 11/1474* (2013.01); *G06F 11/2005* (2013.01); *G06F 11/2089* (2013.01); *G06F 2003/0692* (2013.01)

(58) Field of Classification Search
None
See application file for complete search history.

(56) References Cited

U.S. PATENT DOCUMENTS

| | | | | |
|---|---|---|---|---|
| 5,712,970 A | * | 1/1998 | Arnott | G06F 11/1666 711/113 |
| 2002/0031122 A1 | * | 3/2002 | Martini | H03M 13/356 370/389 |
| 2004/0013105 A1 | * | 1/2004 | Ahmavaara | H04L 1/1845 370/349 |
| 2007/0288792 A1 | * | 12/2007 | Thorpe | G06F 3/0613 714/6.11 |
| 2009/0086657 A1 | * | 4/2009 | Alpert | H04L 1/1838 370/310 |
| 2009/0103500 A1 | * | 4/2009 | Malkamaki | H04L 1/1812 370/336 |
| 2011/0119552 A1 | * | 5/2011 | Park | H03M 13/2975 714/751 |
| 2013/0188471 A1 | * | 7/2013 | Bade | H04L 45/30 370/216 |
| 2015/0032981 A1 | * | 1/2015 | Kawada | G06F 11/1458 711/162 |
| 2015/0207880 A1 | * | 7/2015 | Jin | H04L 67/1097 714/4.11 |

* cited by examiner

*Primary Examiner* — Gabriel Chu
(74) *Attorney, Agent, or Firm* — Haynes and Boone, LLP (57) ABSTRACT

A system and method for performing protected-mode data transactions using an initiator cache is provided. In some embodiments, a protected-mode data transaction is received from an initiator. It is determined that the initiator includes an initiator cache having a cache entry associated with the data transaction. A storage controller of a storage system performs the data transaction in conjunction with a storage device such that the performing of the data transaction is initiated before any writing of the data transaction to a cache of any storage controller of the storage system other than the storage controller based on the determination that the initiator includes the cache entry. In some such embodiments, when it is determined the data transaction failed to complete, a request is provided to the initiator to recreate the transaction from the cache entry in the initiator cache.

23 Claims, 7 Drawing Sheets

SYSTEMS AND METHODS FOR A STORAGE ARRAY-MANAGED INITIATOR CACHE

TECHNICAL FIELD

The present description relates to data storage and retrieval and, more specifically, to caching a data transaction at the initiating system and to managing the initiator's cache by the storage system that receives the data transaction.

BACKGROUND

Networks and distributed storage allow data and storage space to be shared between devices located anywhere a connection is available. These implementations may range from a single machine offering a shared drive over a home network to an enterprise-class cloud storage array with multiple copies of data distributed throughout the world. Larger implementations may incorporate Network Attached Storage (NAS) devices, Storage Area Network (SAN) devices, and other configurations of storage elements and controllers in order to provide data and manage its flow. Improvements in distributed storage have given rise to a cycle where applications demand increasing amounts of data delivered with reduced latency, greater reliability, and greater throughput. Building out the storage architecture to meet these expectations enables the next generation of applications, which is expected to bring even greater demand.

A primary concern when implementing and managing any storage system is ensuring that data transactions complete successfully. While modern hardware is increasingly reliable, device failures, network disruptions, power outages, and other service interruptions are inevitable. Typically, the risk of a glitch increases as the storage solution becomes more complicated. While redundancy can be used to simplify data recovery, redundancy adds expense and can hurt performance. Thus, even if a remote data center includes RAID'ed drives, regular backups, uninterruptible power supplies, and other features designed to protect stored data, transactions may still fail and performance may still not match that of a local drive. These concerns may lead users to over-rely on local storage, which may actually place data at greater risk of being lost.

In order to reliably provide current and future applications with sufficient data at acceptable speeds, a need exists for improvements in performance while maintaining transaction integrity. In particular, systems and methods for improved transaction caching have the potential to improve data access times while still allowing a system to recover lost transactions. Thus, while existing techniques for data transaction handling have been generally adequate, the techniques described herein provide improved performance and reliability.

BRIEF DESCRIPTION OF THE DRAWINGS

The present disclosure is best understood from the following detailed description when read with the accompanying figures.

DETAILED DESCRIPTION

All examples and illustrative references are non-limiting and should not be used to limit the claims to specific implementations and embodiments described herein and their equivalents. For simplicity, reference numbers may be repeated between various examples. This repetition is for clarity only and does not dictate a relationship between the respective embodiments except where explicitly noted. Finally, in view of this disclosure, particular features described in relation to one aspect or embodiment may be applied to other disclosed aspects or embodiments of the disclosure, even though not specifically shown in the drawings or described in the text.

Various embodiments include systems and methods for accessing data by exchanging and performing data transactions (e.g., read and/or write requests). Although the scope of embodiments is not limited to any particular use case, in one example, an initiator running an application manipulates data stored on a remote storage system by exchanging data transactions with the storage system over a network. In parallel, the initiator writes the data transactions in an initiator cache that is non-volatile. This relieves the storage system from maintaining a redundant cached copy while the transaction is in progress because, in the event that the transaction fails, it can be recreated from the cache of the initiator. Accordingly, this technique may reduce overhead and latency by eliminating copying and cache synchronization associated with conventional techniques. Furthermore, because the initiator copy is remote from the storage system, it is possible to recover from a catastrophic failure of the storage system such as a failure of more than one storage controller or cache.

In some embodiments, the initiator writes a first data protection copy to the initiator cache as before. However, the storage system also creates its own protection copy in addition to caching the transaction. Thus, the storage system eventually has the transaction cached across two or more storage system caches. In some such embodiments, the storage system begins performing the transaction on a storage device while the storage system cache copy is being created. In other words, the storage system does not wait for the second copy (i.e., creating the second copy on the storage system) to complete before it begins to access the disk. Because disk access is often the slowest step in a transaction, beginning it earlier in the sequence often reduces total access time. In some such embodiments, when the storage system has created and verified its own redundant copy, the storage system provides a release response to the initiator indicating that the initiator can overwrite the copy in the initiator cache. As a result, the initiator copy may be released well before the transaction completes on the disk. In this way, providing a release response earlier allows the use of a smaller non-volatile cache in the initiator. It is understood that these features and advantages are shared among the various examples herein and that no one feature or advantage is required for any particular embodiment.

Figure 1:
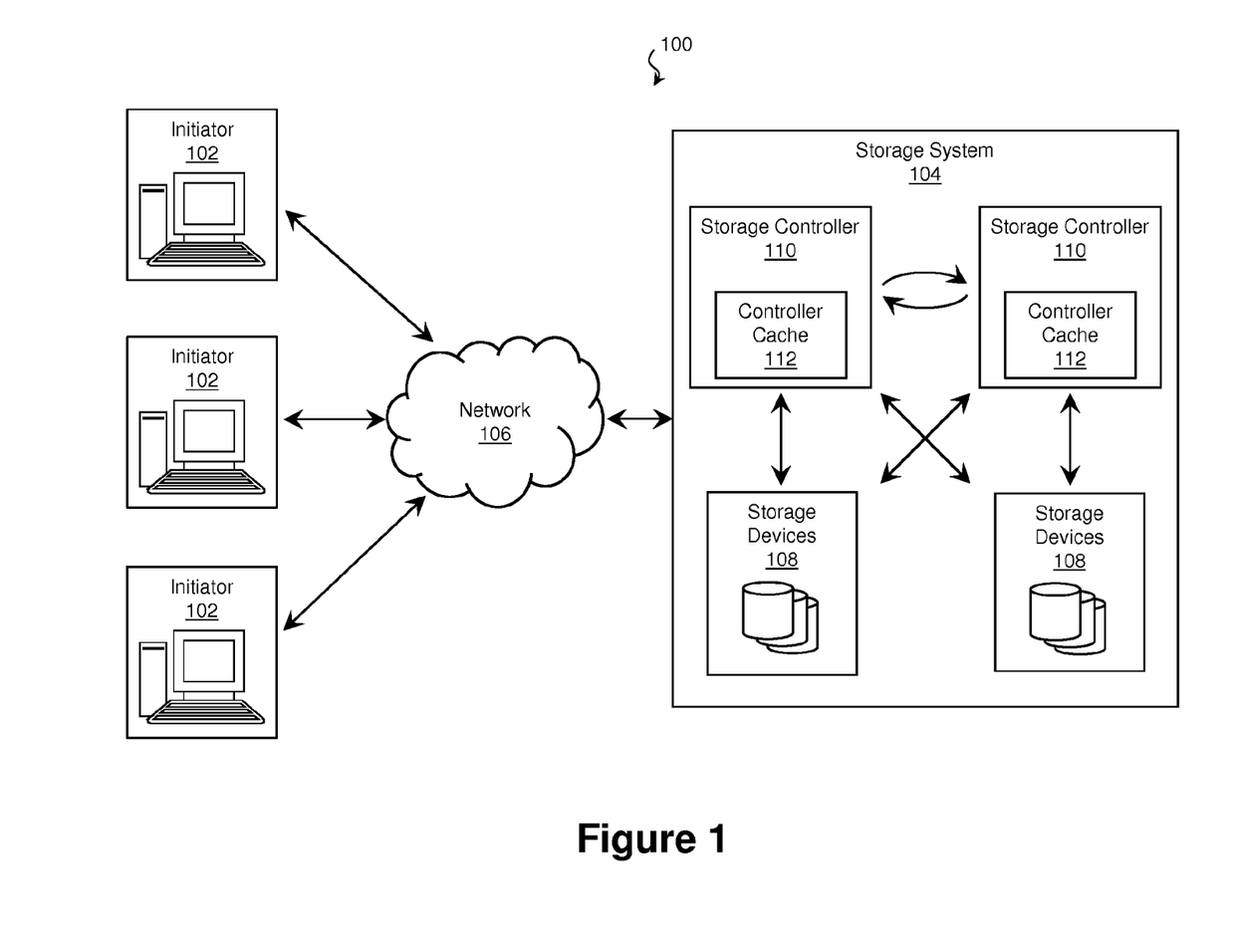
FIG. 1 is a schematic diagram of an exemplary storage architecture according to aspects of the present disclosure.

FIG. 1 is a schematic diagram of an exemplary storage architecture 100 according to aspects of the present disclosure. The storage architecture 100 includes a number of initiators 102 in communication with a number of storage systems 104. It is understood that for clarity and ease of explanation, only a single storage system 104 is illustrated, although any number of initiators 102 may be in communication with any number of storage systems 104. Furthermore, while the storage system 104 and each of the initiators 102 are referred to as singular entities, a storage system 104 or initiator 102 may include any number of computing devices and may range from a single computing system to a system cluster of any size. Accordingly, each initiator 102 and storage system 104 includes a computing system, which in turn includes a processor such as a microcontroller or a dedicated central processing unit (CPU) operable to perform various computing instructions. The computing system may also include a memory device such as random access memory (RAM); a non-transitory computer-readable storage medium such as a magnetic hard disk drive (HDD), a solid-state drive (SSD), or an optical memory (e.g., CD-ROM, DVD, BD); a video controller such as a graphics processing unit (GPU); a communication interface such as an Ethernet interface, a Wi-Fi (IEEE 802.11 or other suitable standard) interface, or any other suitable wired or wireless communication interface; and/or a user I/O interface coupled to one or more user I/O devices such as a keyboard, mouse, pointing device, or touchscreen.

With respect to the initiators 102, an initiator 102 includes any computing resource that is operable to exchange data with a storage system 104 by providing (initiating) data transactions to the storage system 104. In an exemplary embodiment, an initiator 102 includes an application server having a second tier of initiators (e.g., clients) operable to exchange data with the initiator 102 by providing it data transactions. The hierarchical nature of the storage architecture 100 is not limited to any particular number of levels of hierarchy. Each initiator 102 has the ability to run applications (e.g., Internet browsers, word processors, database programs, etc.). Applications include computing software that, when executed by a processor of the initiator 102, causes the processor to perform any suitable computing task. Frequently, these tasks include manipulating locally stored data (i.e., data stored within the initiator 102) as well as data stored remotely on a storage system 104.

To interact with (e.g., read, write, modify, etc.) remote data, an initiator 102 sends one or more data transactions to the respective storage system 104. Data transactions are requests to read, write, or otherwise access data stored within a data storage device such as the storage system 104, and contain fields that may encode a command, data (i.e., information read or written by an application), metadata (i.e., information used by a storage system to store, retrieve, or otherwise manipulate the data such as a physical address, a logical address, a current location, data attributes, etc.), and/or any other relevant information. Data transactions are often categorized as either block-level or file-level. Block-level protocols designate data locations using a logical block address. Exemplary block-level protocols include iSCSI, Fibre Channel, and Fibre Channel over Ethernet (FCoE). A Storage Attached Network (SAN) device is a type of storage system 104 that responds to block-level transactions.

In contrast to block-level protocols, file-level protocols specify data locations by a file name. A file name is an identifier within a file system that can be used to uniquely identify corresponding memory addresses. File-level protocols rely on the storage system 104 to translate the file name into respective memory addresses. Exemplary file-level protocols include SMB/CFIS, SAMBA, and NFS. A Network Attached Storage (NAS) device is a type of storage system 104 that responds to file-level transactions. It is understood that the scope of the present disclosure is not limited to either block-level or file-level protocols, and in many embodiments, the storage system 104 is responsive to a number of different data transaction protocols.

In the illustrated embodiment of FIG. 1, the initiators 102 exchange data transactions with the storage system 104 over a network 106, which may include any number of wired and/or wireless networks such as a Local Area Network (LAN), an Ethernet subnet, a PCI or PCIe subnet, a switched PCIe subnet, a Wide Area Network (WAN), a Metropolitan Area Network (MAN), the Internet, or the like. In so doing, the data transaction may be converted between formats and/or protocols for transmission over the network 106.

Turning now to the storage system 104, it contains any number of storage devices 108 and responds to initiators' data transactions so that the storage devices 108 appear to be directly connected (local) to the initiators 102. In various examples, the storage devices 108 include hard disk drives (HDDs), solid state drives (SSDs), optical drives, and/or any other suitable volatile or non-volatile data storage medium. The storage system 104 may group the storage devices 108 into groups for redundancy and/or speed and may present the grouped devices 108 as a single virtual device. In many embodiments, the storage devices 108 are arranged hierarchically and include a large pool of relatively slow storage devices and one or more caches (i.e., smaller memory pools typically utilizing faster storage media). Portions of the address space are mapped to the caches so that transactions directed to mapped addresses can be performed using the cache. The cache allows the larger memory pool to be accessed less frequently and in the background. In an embodiment, the storage devices 108 include HDDs, while a cache includes NAND-based SSDs.

The storage system 104 also includes one or more storage controllers 110 in communication with the storage devices 108 and any respective caches. The storage controllers 110 exercise low-level control over the storage devices 108 in order to execute (perform) data transactions on behalf of the initiators 102. In this capacity, a storage controller 110 may present a group of storage devices 108 as a single seamless device through one or more virtualization techniques such as RAID (Redundant Array of Independent/Inexpensive Disks). At a high level, virtualization includes mapping the physical addresses of the storage devices 108 into a virtual address space and presenting the virtual address space to the initiator 102. In this way, the complexity of the storage system 104 is hidden from the initiators.

In the illustrated embodiment, the storage system 104 includes two storage controllers 110 in communication with groups of storage devices 108. In some such embodiments, the storage controllers 110 act in a peer relationship where any storage controller 110 that receives a data transaction from an initiator 102 may perform the data transaction. In other embodiments, a primary storage controller 110 performs data transactions while a backup storage controller 110 only performs data transactions should the primary storage controller 110 fail.

As discussed above, the possibility remains that a transaction may fail before it reaches the storage devices 108. Of particular concern is that the storage system 104 will report a transaction as successfully writing to the storage devices 108 while a failure prevents the write from actually occurring. To address this, certain classes of transactions, referred to herein as protected-mode transactions, guarantee that the requested changes are eventually written to the storage devices 108. To insure against failure, at least two copies of the associated data may be retained across controllers 110 until the transaction is completed on the storage devices 108. The additional copy is used to recover the data and recreate the transaction if it fails.

In a typical example, a copy of the associated data is stored in the caches of two different storage controllers. In the interest of brevity, the examples herein describe a protected-mode write transaction, although it is understood that the principles herein apply equally to any data transaction where two or more copies are retained to so that the transaction may be recovered. Thus, in an embodiment, a first storage controller 110 stores a copy of the data and/or metadata to be written in its controller cache 112 prior to performing the transaction on the storage devices 108. The controller cache 112 may be any volatile or non-volatile storage medium, and common examples include battery-backed DRAM and SSDs. The first storage controller 110 also provides the data and/or metadata to a second storage controller 110 for storing in the controller cache 112 of the second storage controller 110. This duplication takes place before the transaction is performed on the storage devices 108. In this way, the storage system 104 can recreate the transaction should the first storage controller 110 fail before the write to storage is complete.

Once the second storage controller 110 has cached a redundant copy of at least the associated data and possibly the entire transaction, the storage system 104 may provide the initiator 102 with a transaction completion response even if the transaction has not yet written to the storage device 108. To the initiator 102, a protected-mode transaction is not safely received until the redundant copy is made because before that point, the transaction may be lost if the first storage controller 110 fails. After the copy is made and the completion response is received, however, an initiator 102 application may proceed and may rely on the guarantee that the storage system 104 can recover the transaction from the duplicate copy. It is understood that further embodiments expand on this redundancy by applying these principles the groups of three or more storage controllers 110 or three or more copies of the data transaction.

Figure 2:
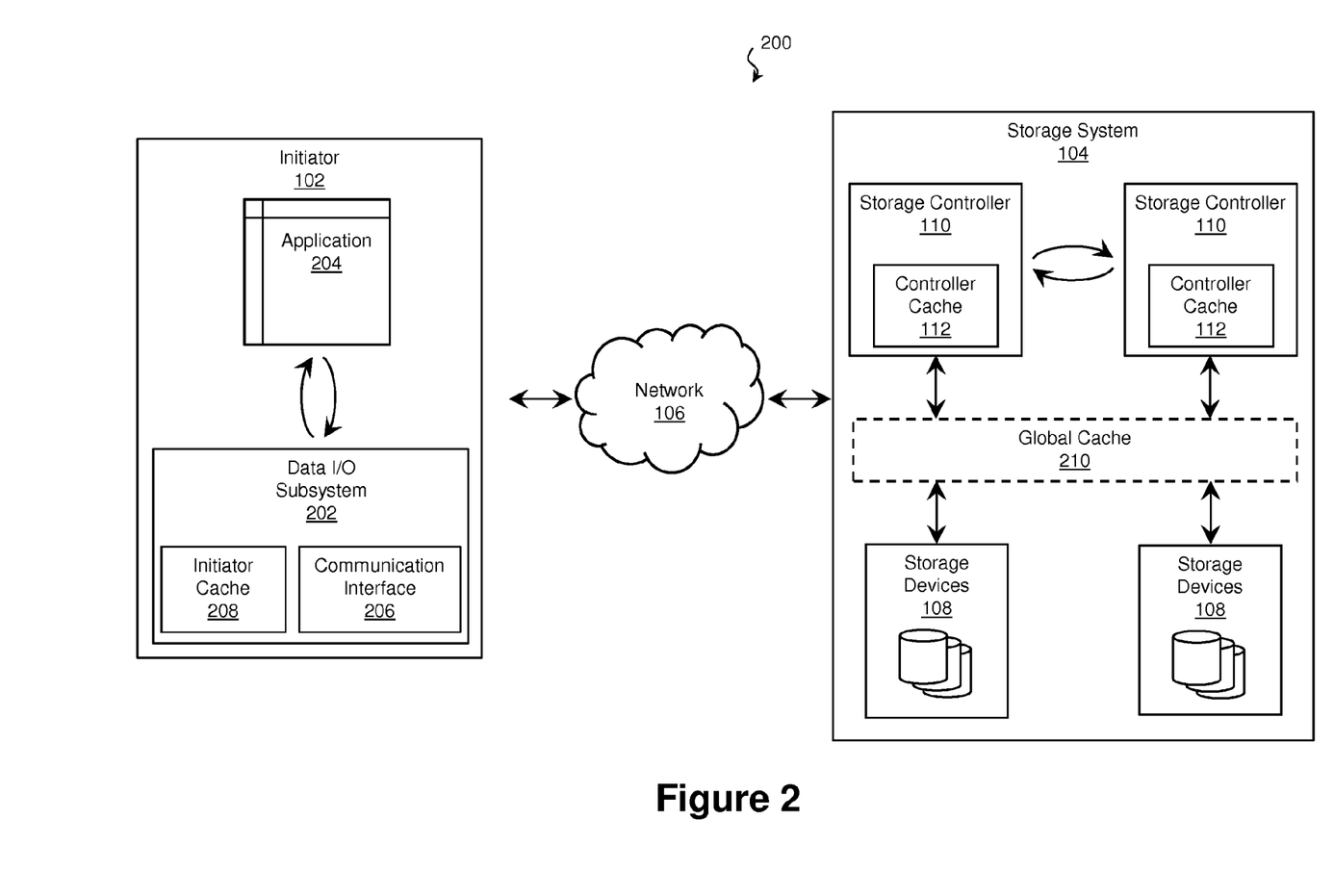
FIG. 2 is a schematic diagram of an exemplary storage architecture incorporating an initiator cache according to aspects of the present disclosure.
Figure 3:
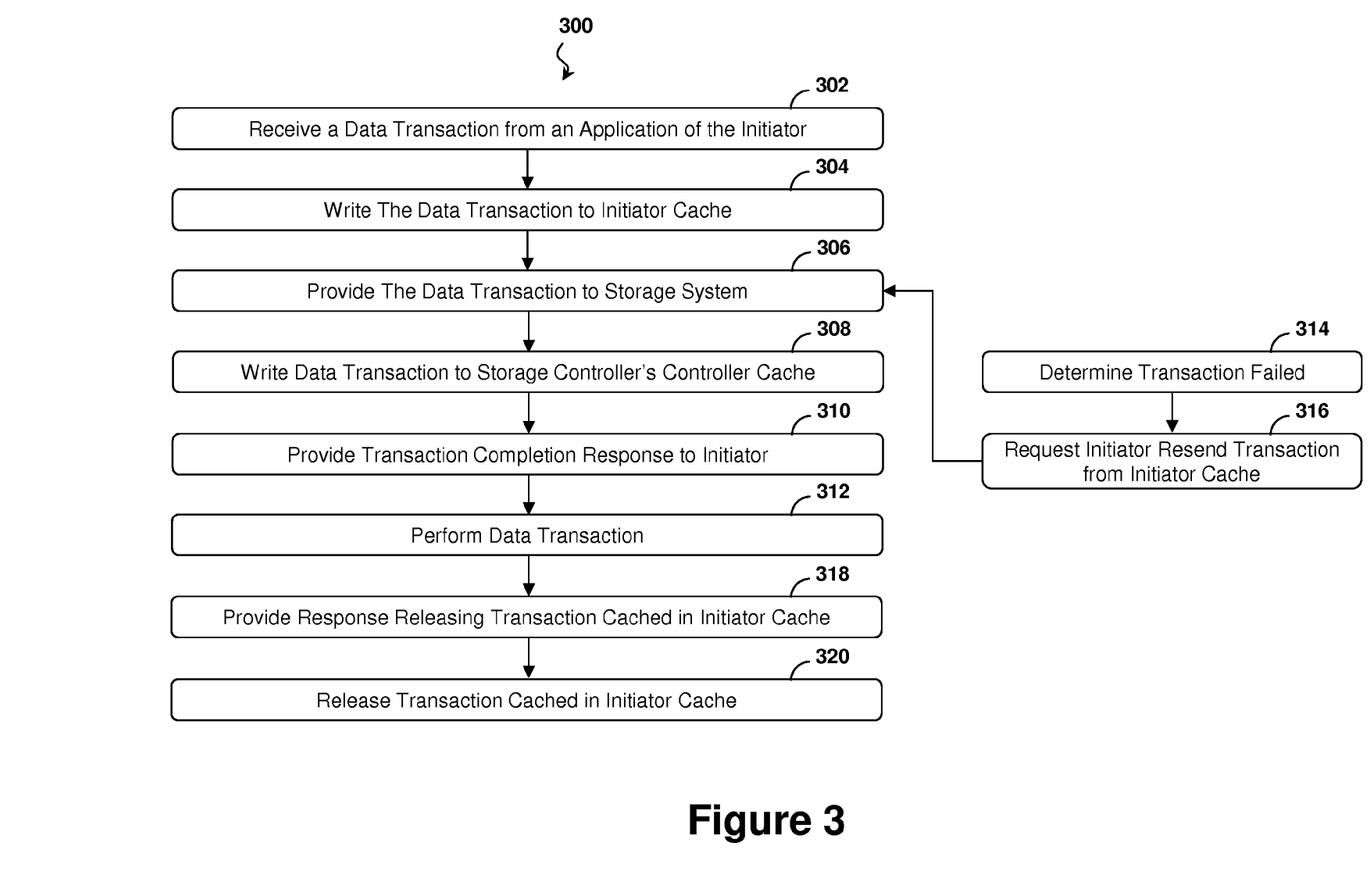
FIG. 3 is a flow diagram of a method of performing a data transaction utilizing the initiator cache according to aspects of the present disclosure.
Figure 4:
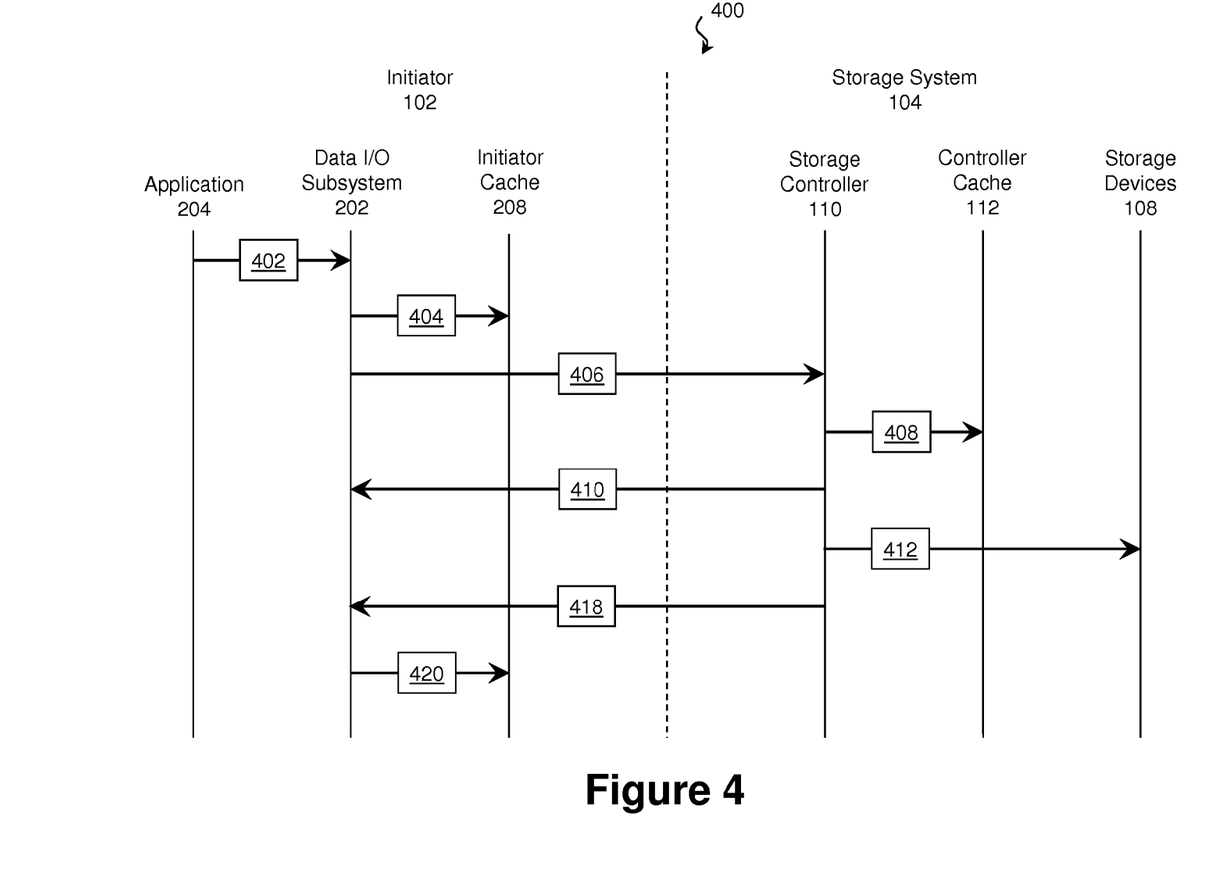
FIG. 4 is a timing diagram illustrating an exemplary sequence for performing the method of performing a data transaction utilizing the initiator cache according to aspects of the present disclosure.

Further embodiments modify the protected-mode procedure to provide greater fault tolerance with less latency and overhead though the use of an initiator cache. For example some such embodiments are shown in FIGS. 2-4. FIG. 2 is a schematic diagram of an exemplary storage architecture 200 incorporating an initiator cache according to aspects of the present disclosure. FIG. 3 is a flow diagram of a method 300 of performing a data transaction utilizing the initiator cache according to aspects of the present disclosure. It is understood that additional steps can be provided before, during, and after the steps of method 300, and that some of the steps described can be replaced or eliminated for other embodiments of the method. FIG. 4 is a timing diagram illustrating an exemplary sequence 400 for performing the method 300 of performing a data transaction utilizing the initiator cache according to aspects of the present disclosure.

Referring first to FIG. 2, the illustrated storage architecture 200 includes an initiator 102 and a storage system 104 each substantially similar to those described with respect to FIG. 1. In that regard, the initiator 102 also includes a data I/O subsystem 202 that sends and receives data transactions directed between an application 204 and a storage system 104. The data I/O subsystem 202 includes a communication interface 206 for communicating with the storage system 104 over the network 106 and an initiator cache 208 for caching a portion of the address space of the storage system 104. In an exemplary embodiment, the initiator cache 208 includes an SSD.

Referring to FIG. 2 and to block 302 of FIG. 3, the data I/O subsystem 202 receives a request to read or write data from an application 204 running on the initiator. In an example, the request seeks to write data and/or metadata to a memory location of the storage system 104. The data I/O subsystem 202 may translate the request into one or more data transactions for the storage system 104. This may include changing the fields of the request to suit a protocol of the storage system 104, address translation, adding data or metadata to the request, or any other suitable transformation.

Referring to block 304 of FIG. 3, the data I/O subsystem 202 caches the data transaction within the initiator cache 208 by writing the associated data and/or metadata to an entry of the initiator side cache 208. The initiator cache 208 provides the initiator 102 with a local copy of a subset of the data stored on the storage system 104 and may be used to satisfy some transactions (e.g., some read transactions) without forwarding the transaction to the storage system 104. In addition, by caching a protected-mode data transaction, the initiator cache 208 can be used to recreate the transaction if it is lost before being completed by the storage system 104. As will be disclosed in greater detail below, maintaining a cached copy within the initiator 102 provides a number of advantages over a relying solely on the storage system 104 to store redundant copies of the data.

Referring to block 306 of FIG. 3, the data I/O subsystem 202 forwards the data transaction to the storage system 104 over the communication interface 206. To avoid stalling either task, the data I/O subsystem 202 may cache the data transaction in the initiator cache 208 and forward it to the storage system 104 concurrently. The forwarded data transaction is received by the storage system 104 and, in the illustrated embodiment, is provided by the storage system 104 to one of its storage controllers 110. Referring to block 308 of FIG. 3, the storage controller 110 stores the data transaction in its controller cache 112 by writing at least the associated data and/or metadata to an entry of the controller cache 112.

Referring to block 310 of FIG. 3, upon storing the data transaction in the storage controller 110, the storage system 104 provides a transaction completion response to the initiator 102. As can be seen, the storage system 104 may respond that the transaction is complete before writing to the storage devices 108 and without storing a redundant copy (i.e., with only the single instance of the data and/or metadata stored on the storage system 104). Similar to the examples above, the initiator 102 considers the transaction safely received once two (or more) copies of the associated data exist. However, in the above examples, the storage system 104 does not provide the completion response and does not proceed to write to the storage devices 108 until at least two copies of the data are stored within the storage system 104. In contrast, in the present embodiments, one copy resides on the initiator 102 in the initiator cache 208 while one copy resides on the storage system 104 at the storage controller 110 when the completion response is sent.

Having copies at the initiator 102 and the storage system 104 provides a number of advantages. In some embodiments, the use of the data copy in the initiator cache 208 for redundancy avoids the transaction replication step that occurs between storage controllers 110. Replication is often a high-latency operation that delays providing the completion response and delays the release of the data in the initiator cache 208 for reuse. Eliminating this step not only reduces overall latency, it improves burst rate, a measure of how many transactions can be performed in a narrow window of time, reduces the burden on the interface between the storage controllers 110, and reduces the processing burden on the storage system to maintain cache consistency between storage controllers 110. As a further benefit, the number of flushes of the controller caches 112 may be reduced because each transaction writes to a single controller cache 112 rather than multiple controller caches 112. For these reasons and others, in many embodiments, load on the storage system 104 is reduced and application response times are improved.

As an additional benefit, storing copies on different systems provides greater recoverability. While multiple storage controllers 110 provide some redundancy, it is still possible for a storage controller 110 to fail and bring down other controllers because of hidden storage system 104 dependencies. For example, the storage system 104 may experience a catastrophic hardware failure. However, storing a copy of the data in the initiator cache 208 allows the transaction to be recreated in the event of such a hardware failure.

Referring to block 312, the storage controller 110 performs the data transaction in conjunction with the storage devices 108. This may include reading, writing, or otherwise manipulating data stored on the storage devices 108 and may be performed concurrently with sending the completion response as described in block 310. For many of the same reasons that copies of protected-mode transactions are retained in case the original transaction fails, copies of data stored on the storage devices 108 are often spread across devices to provide data redundancy. Therefore, in many embodiments, the storage controller 110 performs the data transaction by writing multiple copies (and/or other recovery data such as checksums) to the storage devices 108. In some such embodiments, the storage devices 108 are arranged as a RAID array, and data is written in redundantly in accordance with the associated RAID level.

Additionally, in some embodiments, the devices of the storage system 104 are arranged hierarchically with smaller and faster storage devices acting as a cache for larger, slower, and less expensive devices. Accordingly, in some such embodiments, the storage controller 110 performs the transaction by accessing the cache, such as the global cache 210 of FIG. 2, and allows the cache to manage the interactions with the storage devices 108. In an example, a storage controller 110 performs a protected-mode write by writing the data to a persistent and redundant SSD global cache 210 and proceeds on to other tasks such as those of blocks 318 and 320 described below. At a later time, the global cache 210 writes the data to one or more HDDs of the storage devices 108.

Referring to block 314, should the storage system 104 determine that the transaction failed to complete for any reason, including hardware failure, the storage system 104 may recover the transaction by requesting it to be reconstructed by the initiator 102 from the initiator cache 208 and to be resent in block 316. The request may identify the transaction to be reconstructed by a target address, a transaction ID, a timestamp, and/or other identifier. Upon receiving the request, the initiator 102 may query the initiator cache 208 to determine a data, and/or metadata payload for the reconstructed transaction. The method 300 then repeats the processes of blocks 306-312 until the transaction is successful.

Referring to block 318, the storage controller 110 may provide a second response, a good completion status, to the initiator 102 upon writing the data and/or metadata to the storage devices 108. The second response indicates to the initiator 102 that the copy of the data within the initiator cache 208 is no longer being relied upon by the storage system 104 to protect the transaction. Until the second response is received, the initiator 102 preserves the copy in the initiator cache 208 even as subsequent data transactions are generated by the application 204, and for this reason, in many embodiments, the initiator cache 208 is a fully-associative cache. Upon receiving the second response indicating that the transaction has completed, in block 320, the data I/O subsystem 202 of the initiator 102 releases the transaction from the initiator cache 208 allowing it to be overwritten.

Referring now to FIG. 4, an exemplary sequence 400 for performing the method 300 of executing a data transaction utilizing the initiator cache is described. Arrow 402 represents the data I/O subsystem 202 receiving a request from an application 204 running on the initiator and generating a data transaction as described in block 302. The data transaction is directed to a memory location of the storage system 104. Arrow 404 represents the data I/O subsystem 202 caching the received data transaction within the initiator cache 208 as described in block 304. Arrow 406 represents the data I/O subsystem 202 forwarding the data transaction to the storage system 104, and in particular the storage controller 110 of the storage system 104, as described in block 306. In some exemplary sequences, the transaction caching of arrow 404 is performed concurrently with the transaction forwarding of arrow 406.

Arrow 408 represents the storage controller 110 storing the data transaction in its controller cache 112 as described in block 308. Arrow 410 represents the storage controller 110 providing a transaction completion response to the data I/O subsystem 202 of the initiator 102 as described in block 310. Arrow 412 represents the storage controller 110 performing the data transaction in conjunction with the storage devices 108 as described in block 312. Arrow 418 represents the storage system 104 providing a second response (a good completion status response) to the initiator 102 upon completion of the transaction as described in block 318. Arrow 420 represents the data I/O subsystem 202 releasing the transaction in the initiator cache 208 allowing it to be overwritten as described in block 320.

Until the cache entry is overwritten, it is available for other purposes such as satisfying subsequent read transactions. For example, in an embodiment, the data I/O subsystem 202 receives a request for data from an application 204 running on the initiator. The data is stored at a memory location of the storage system 104. However, if the data I/O subsystem 202 determines that the corresponding data is available from the initiator cache 208, whether cached as part of method 300 or in response to a transaction such as a previous read transaction, the data I/O subsystem 202 retrieves the data from the initiator cache 208 and provides it to the application 204. This allows the data to be retrieved at a speed approximating reads of other local data.

On the other hand, if the data I/O subsystem 202 determines that the corresponding data is not available from the initiator cache 208, the data I/O subsystem 202 generates a data transaction and forwards the data transaction to the storage controller 110 of the storage system 104. The storage controller 110 retrieves the data from the storage devices 108 or a cache thereof and returns it to the data I/O subsystem 202. The data I/O subsystem 202 provides the data to the application 204 and may also cache the data in the initiator cache 208 so that it may be used to satisfy subsequent transactions. In embodiments with more than one initiator, each data I/O subsystem 202 may be responsible for maintaining the consistency of the respective initiator cache 208.

Figure 5:
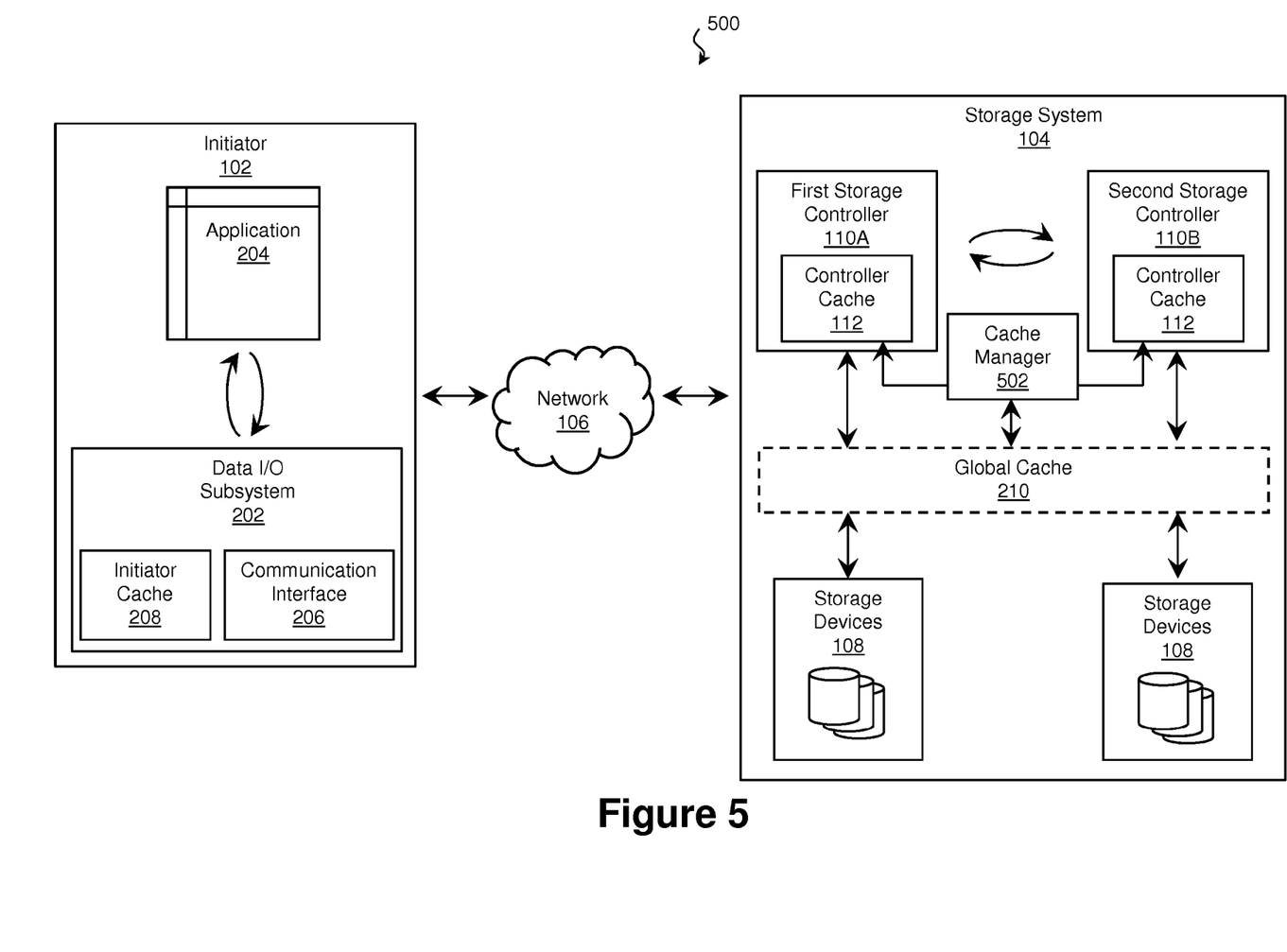
FIG. 5 is a schematic diagram of an exemplary storage architecture incorporating an initiator cache according to aspects of the present disclosure.
Figure 6:
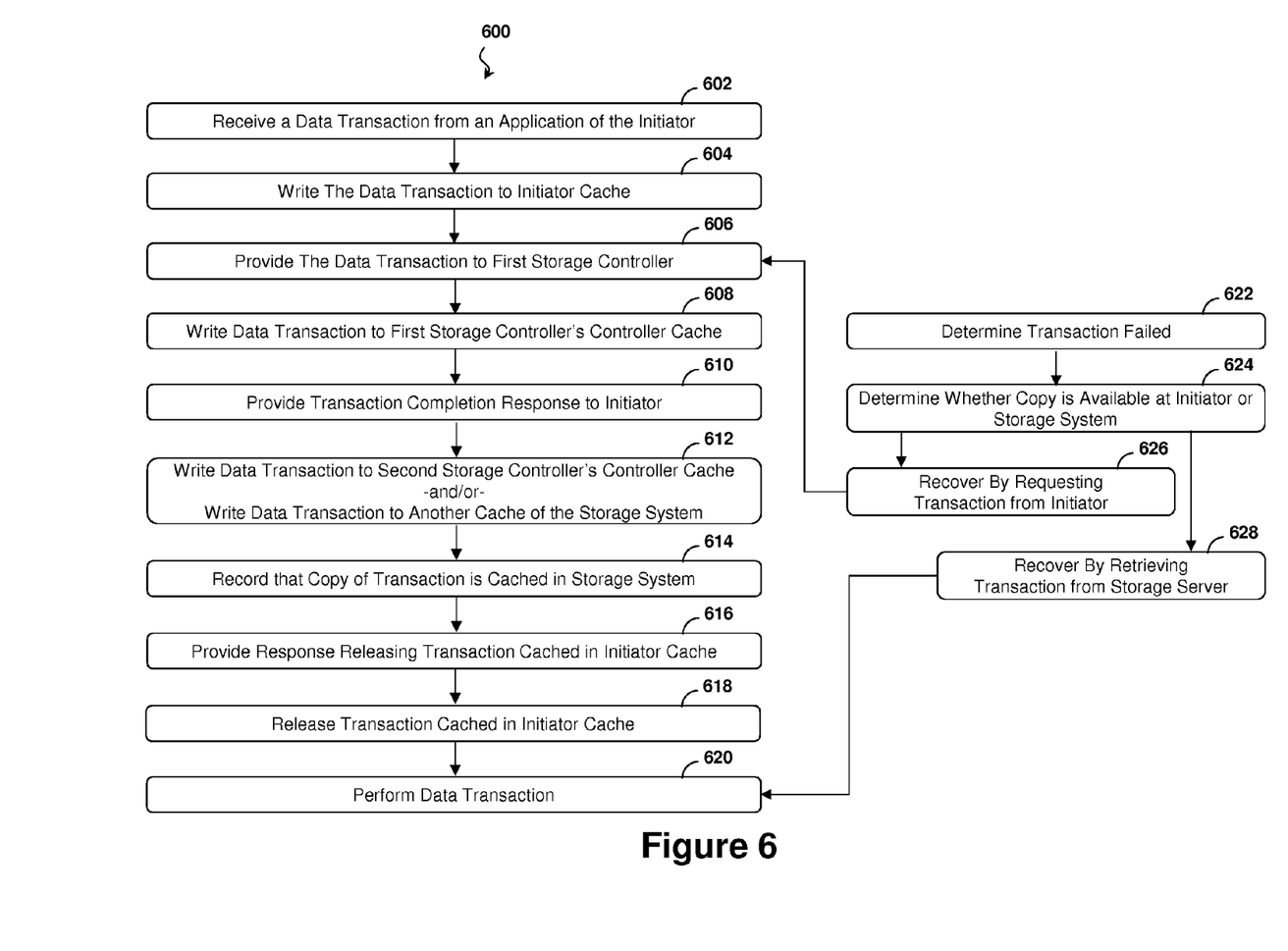
FIG. 6 is a flow diagram of a method of performing a data transaction utilizing an early initiator cache release according to aspects of the present disclosure.
Figure 7:
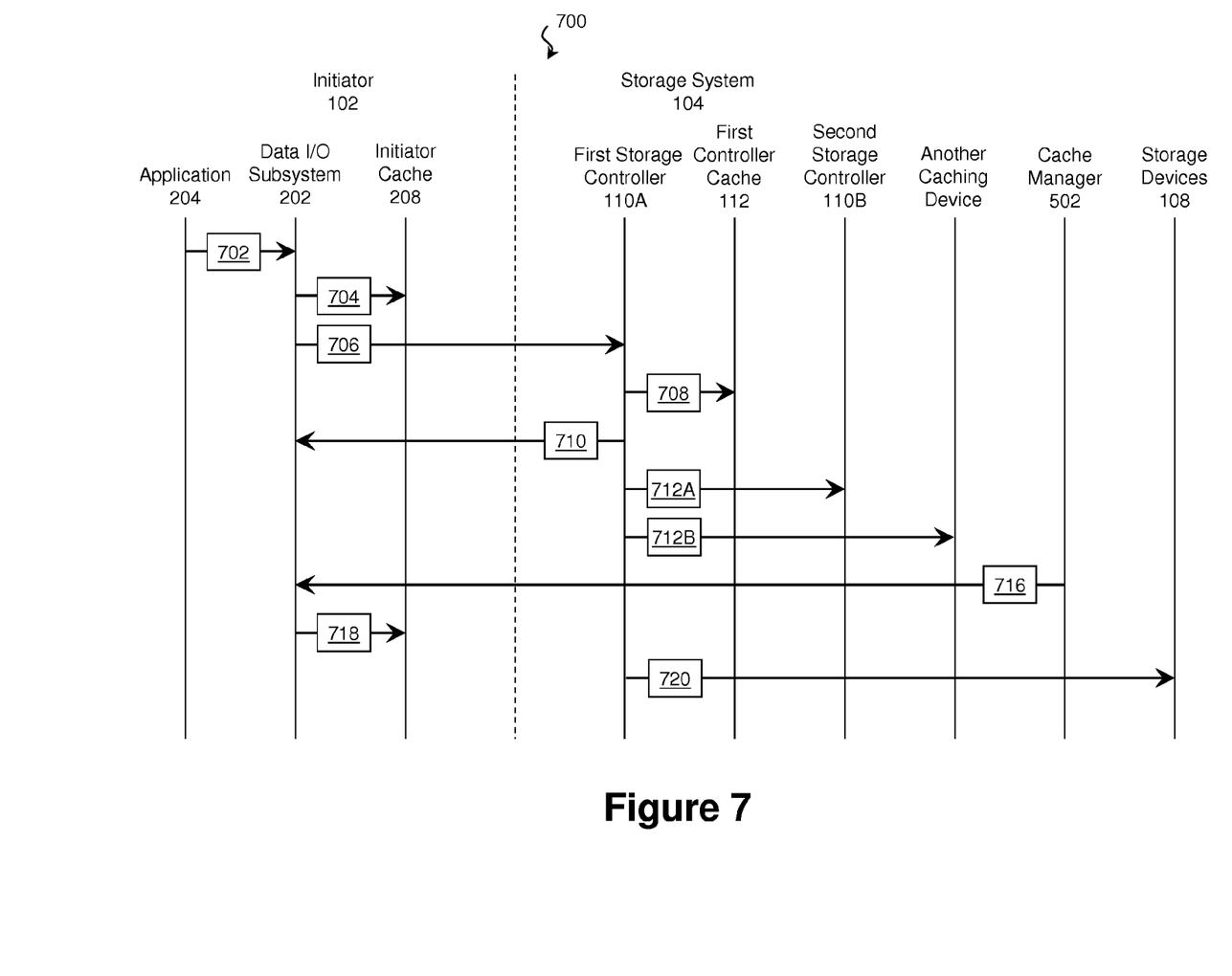
FIG. 7 is a timing diagram illustrating an exemplary sequence for performing the method of performing a data transaction utilizing an early initiator cache release according to aspects of the present disclosure.

As discussed above, the initiator 102 retains an entry corresponding to the data transaction in the initiator cache 208 in order to reconstruct the protected-mode transaction should it fail. As the number of transactions generated by an application 204 increases, the required size for the initiator cache 208 often increases as well. Further embodiments that provide similar advantages of improved redundancy and reduced latency while using a smaller initiator cache 208 are described in FIGS. 5-7. FIG. 5 is a schematic diagram of an exemplary storage architecture 500 incorporating an initiator cache according to aspects of the present disclosure. FIG. 6 is a flow diagram of a method 600 of performing a data transaction utilizing an early initiator cache release according to aspects of the present disclosure. It is understood that additional steps can be provided before, during, and after the steps of method 600, and that some of the steps described can be replaced or eliminated for other embodiments of the method. FIG. 7 is a timing diagram illustrating an exemplary sequence 700 for performing the method 600 of performing a data transaction utilizing an early initiator cache release according to aspects of the present disclosure.

Referring first to FIG. 5, the illustrated storage architecture 500 includes an initiator 102 and a storage system 104 each substantially similar to those described with respect to FIGS. 1 and 2. The storage architecture that includes storage system 104 may also include a cache manager 502, which is described in greater detail below.

Referring to FIG. 6, blocks 602-608 may proceed substantially similar to blocks 302-308 of FIG. 3. In that regard, in block 602, the data I/O subsystem 202 receives a request to read or write transaction from an application 204 running on the initiator 102 and translates the request into one or more data transactions. In block 604, the data I/O subsystem 202 caches a data transaction at the initiator 102 within the initiator cache 208. In block 606, the data I/O subsystem 202 forwards the data transaction to the storage system 104 over the communication interface 206. Referring to FIG. 5, the data transaction is forwarded to the first storage controller 110A of the storage system. In block 608, the first storage controller 110A stores the data transaction in its controller cache 112.

In the previous examples, the storage controller 110 begins performing the transaction sooner by not creating a redundant copy on the storage system 104. Instead, redundancy comes from the copy stored in the initiator cache 208. The initiator 102 retains the copy until the transaction successfully completes so that it may be recovered in the event of a failure. However, in some embodiments, the initiator copy is released earlier in the process in order to free up cache space for subsequent transactions. In such embodiments, the storage system 104 writes the transaction to a second cache on the second controller 110B, thereby creating an additional copy. When the second copy is complete, the storage system 104 releases the initiator 102 to overwrite the copy in the initiator cache 208. In contrast to other examples, the storage system 104 may duplicate the transaction and perform the transaction on the storage devices 108 concurrently. The transaction remains protected specifically because the initiator 102 retains a copy until the storage system 104 has successfully duplicated the transaction to the second controller. In such embodiments, a cache manager 502 of the storage system 104 monitors the duplication process, issues a response to release the initiator-side copy, and tracks the location of the copy to use in the event of a failure.

Referring to block 610, upon caching the data transaction by the first storage controller 110A (the first cached copy of the transaction), the storage system 104 provides a transaction completion response to the initiator 102, similar to block 310 of FIG. 3. The storage system 104 may provide the completion response before, during, or after creating of the second redundant copy as described below.

Referring to block 612, the storage system 104 duplicates the transaction by storing a second copy of the associated data and/or metadata in a cache outside of the first storage controller 110A. In some embodiments, the first storage controller 110A provides the transaction or a subset thereof to a second storage controller 110B to store in the controller cache 112 of the second storage controller 110B. Additionally or in the alternative, in some embodiments, the first storage controller 110A stores the second copy in another storage device external to the first storage controller 110A, for example, a global cache 210. Referring to block 614, the cache manager 502 records that the second copy of the transaction is now available on the storage system 104. Referring to block 616, once the second copy of the transaction has been stored in the storage system 104, the cache manager 502 provides a second response, a good completion status, to the initiator 102 releasing the copy in the initiator cache 208 to be overwritten, which the data I/O subsystem 202 performs in block 618. By providing the release response prior to completing the transaction, and in some cases, before the transaction is even begun, the method 600 frees the associated initiator cache 208 entry sooner and allows the use of a smaller initiator cache 208.

Referring to block 620, the first storage controller 110A performs the data transaction in conjunction with the storage devices 108 substantially as described with respect to block 312 of FIG. 3. In many embodiments, the storage system 104 duplicates the transaction in blocks 612-616 and performs the transaction in block 620 concurrently. The transaction remains protected because the copy of the data remains available from initiator cache 208 at least until a copy of the data is available on storage system 104.

Referring to blocks 622-628, should the storage system 104 determine that the transaction failed to complete for any reason, including hardware failure, the storage system 104 locates a copy of the transaction or associated data and recovers it from the appropriate location. In block 622, it is determined that the transaction failed to complete. In block 624, the cache manager 502 determines whether a copy of the transaction is available at the initiator 102 or the storage system 104 by determining whether a release response was sent to the initiator 102 in block 616. If the response was not sent, the cache manager 502 recovers the transaction by requesting it to be it to be reconstructed by the initiator 102 from the initiator cache 208 and to be resent as indicated by block 626. The method 600 then repeats the processes of blocks 606-620 until the transaction is successful.

Referring to block 628, if the cache manager 502 determines that the release response was sent, the cache manager 502 locates the copy of the transaction stored in the storage system 104 in block 612 and retrieves it. The method then repeats the processes of block 620 until the transaction is successfully completed.

Referring now to FIG. 7, an exemplary sequence 700 for performing the method 600 of performing a data transaction utilizing an early initiator cache release is described. Arrow 702 represents the data I/O subsystem 202 receiving a request to access data from an application 204 running on the initiator and generating a data transaction as described in block 602. The data transaction is directed to a memory location of the storage system 104. Arrow 704 represents the data I/O subsystem 202 caching the received data transaction within the initiator cache 208 as described in block 604. Arrow 706 represents the data I/O subsystem 202 forwarding the data transaction to the storage system 104, and in particular the first storage controller 110A, as described in block 606. The caching of arrow 704 may be performed concurrently with the forwarding of arrow 706.

Arrow 708 represents the first storage controller 110A storing the data transaction in its controller cache 112 as described in block 608. Arrow 710 represents the storage system 104 providing a transaction completion response to the data I/O subsystem 202 of the initiator 102 as described in block 610. The first storage controller 110A then creates and stores a copy of the transaction. Arrow 712A represents the first storage controller 110A providing the transaction to the second storage controller 110B to store in its controller cache 112 as described in block 612. Arrow 712B represents the first storage controller 110A providing the transaction to another storage device external to the first storage controller 110A as also described in block 612. In embodiments where the processes of both arrows 712A and 712B are performed, the processes may be performed sequentially in any order or concurrently. Arrow 716 represents the cache manager 502 providing a second response (a good completion status response) to the initiator 102 releasing the copy in the initiator cache 208 to be overwritten as described in block 616. Arrow 718 represents the data I/O subsystem 202 releasing the transaction in the initiator cache 208 allowing it to be overwritten as described in block 618.

Arrow 720 represents the first storage controller 110A performing the data transaction in conjunction with the storage devices 108 as described in block 720. In many embodiments, the storage system 104 duplicates the transaction and performs the transaction concurrently.

As can be seen, the storage system 104 relies on the initiator 102 to be able to recreate the data transaction. However, a storage system 104 that serves a substantial number of initiators 102 may have one or more initiators 102 that do not support initiator-side caching. Accordingly, the storage system 104 may be capable of performing a conventional protected-mode technique in addition to one or more of the techniques described herein. For this reason and others, in various embodiments, a storage system 104 performs method 300 or method 600 only upon determining that the initiator 102 providing a data transaction supports initiator-side transaction recovery. In some such embodiments, the initiator 102 indicates that it includes an initiator cache 208 and supports initiator-side transaction recovery using a field of the data transaction. In one such embodiment, certain values in a group number field of a SCSI command indicate that the initiator 102 sending the command supports initiator-side transaction recovery. In further embodiments, other transaction fields, particularly diagnostic fields are used.

Embodiments of the present disclosure can take the form of a computer program product accessible from a tangible computer-usable or computer-readable medium providing program code for use by or in connection with a computer or any instruction execution system. For the purposes of this description, a tangible computer-usable or computer-readable medium can be any apparatus that can store the program for use by or in connection with the instruction execution system, apparatus, or device. The medium can be an electronic, magnetic, optical, electromagnetic, infrared, or a semiconductor system (or apparatus or device). In some embodiments, one or more processors running in one or more of the initiator 102 and the storage system 104 execute code to implement the actions described above.

Thus, the present disclosure provides a system and method for performing data transactions using an initiator cache. In some embodiments, a method of transacting data by a storage system is provided. The method comprises: receiving a data transaction from an initiator, wherein the data transaction is a protected-mode transaction; determining that the initiator includes an initiator cache having an cache entry associated with the data transaction; and performing, by a storage controller of the storage system, the data transaction in conjunction with a storage device, wherein the performing of the data transaction is initiated before any writing of the data transaction to a cache of any storage controller of the storage system other than the storage controller based on the determining that the initiator includes the cache entry. In some such embodiments, the method further comprises: determining the data transaction failed to complete; and providing a request to the initiator to recreate the transaction from the cache entry in the initiator cache.

In further embodiments, the method of transacting data comprises: receiving, at a first storage controller of a storage system, a protected-mode data transaction from an initiator; writing the protected-mode data transaction to a cache of the first storage controller; providing a transaction completion response; writing a copy of the protected-mode data transaction to a cache other than the cache of the first storage controller after providing the transaction completion response; providing a second response to the initiator releasing a copy of the protected-mode data transaction from an initiator cache; and performing the protected-mode data transaction on a storage device of the storage system.

In yet further embodiments, the system comprises: a processing resource; a first storage controller; and at least one storage device, wherein the system is operable to: receive a protected-mode data transaction from an initiator; and perform the data transaction on the at least one storage device using the storage controller, wherein the system initiates the performing of the data transaction without caching the data transaction on any storage controller of the system other than the first storage controller. In some such embodiments, the system is further operable to determine, based on the data transaction, whether an initiator of the system has cached the data transaction, and the system initiates the performing of the data transaction without caching the data transaction on any storage controller of the system other than the first storage controller based on the determination.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of transacting data by a storage system, the method comprising:
receiving a data transaction from an initiator, wherein the data transaction is a protected-mode transaction;
determining from a field of the data transaction that the initiator includes an initiator cache having a cache entry associated with the data transaction;

performing, by a storage controller of the storage system, the data transaction in conjunction with a storage device, wherein the performing of the data transaction is initiated before any writing of the data transaction to a cache of any storage controller of the storage system other than the storage controller based on the determining that the initiator includes the cache entry;
providing, to the initiator, a response releasing the cache entry associated with the data transaction for overwriting; and
providing, to the initiator, a transaction complete response prior to providing the response releasing the cache entry.

2. The method of claim 1 further comprising:
determining the data transaction failed to complete; and
providing a request to the initiator to recreate the transaction from the cache entry in the initiator cache.

3. The method of claim 1, wherein the providing of the transaction complete response is performed prior to any writing of the data transaction to a cache of any storage controller of the storage system other than the storage controller.

4. The method of claim 1, wherein the storage controller is a first storage controller, the method further comprising writing the data transaction to a controller cache of a second storage controller concurrent with the performing of the data transaction in conjunction with the storage device.

5. The method of claim 1, wherein the storage controller is a first storage controller, and wherein the providing of the response releasing the cache entry is performed in response to writing the data transaction to a controller cache of a second storage controller.

6. The method of claim 1, wherein the providing of the transaction complete response is performed in response to writing the data transaction to a cache of the storage controller.

7. The method of claim 1, wherein the field of the data transaction is one of a SCSI group number field and a diagnostic field.

8. A method of transacting data, the method comprising:
receiving, at a first storage controller of a storage system, a protected-mode data transaction from an initiator;
writing the protected-mode data transaction to a cache of the first storage controller;
providing a transaction completion response;
writing a copy of the protected-mode data transaction to a cache other than the cache of the first storage controller after providing the transaction completion response;
providing a second response to the initiator releasing a copy of the protected-mode data transaction from an initiator cache; and
performing the protected-mode data transaction on a storage device of the storage system.

9. The method of claim 8, wherein the second response is provided before the performing of the protected-mode data transaction on the storage device is completed.

10. The method of claim 8, further comprising:
determining that the protected-mode data transaction failed to complete; and
recovering the protected-mode data transaction from one of the initiator and the storage system based on whether the second response had yet been provided.

11. The method of claim 8, wherein the performing of the protected-mode data transaction on the storage device is performed concurrently with the writing of the copy of the protected-mode data transaction to the cache other than the cache of the first storage controller.

12. The method of claim 8, wherein a field of the protected-mode data transaction indicates that the initiator includes the initiator cache, and wherein the writing of the copy of the protected-mode data transaction to the cache other than the cache of the first storage controller is performed after the providing of the transaction completion response based on the field.

13. The method of claim 12, wherein the field is a group number field of a SCSI command, and wherein a value in the group number field indicates that the initiator includes the initiator cache.

14. A system comprising:
a processing resource;
a first storage controller;
at least one storage device; and
a cache manager,
wherein the system is operable to
receive a protected-mode data transaction from an initiator;
perform the data transaction on the at least one storage device using the storage controller, wherein the system initiates the performing of the data transaction without caching the data transaction on any storage controller of the system other than the first storage controller; and
provide, to the initiator, a response releasing a cache entry associated with the data transaction for overwriting,
wherein the cache manager is operable to determine when a copy of the data transaction has been cached to a cache of the system that is outside of the first storage controller, and
wherein the system provides the response releasing the cache entry based on a determination that the copy of the data transaction has been cached to the cache of the system that is outside of the first storage controller.

15. The system of claim 14, wherein the system is further operable to determine, based on the data transaction, whether an initiator of the system has cached the data transaction, and wherein the system initiates the performing of the data transaction without caching the data transaction on any storage controller of the system other than the first storage controller based on the determination.

16. The system of claim 14, wherein the system is further operable to:
determine the data transaction failed to complete; and
upon a determination that the data transaction failed to complete, recover the data transaction by requesting the initiator to reconstruct the data transaction from a cache entry stored at the initiator.

17. The system of claim 14, wherein the system is further operable to cache a copy of the data transaction to a cache of the system and perform the data transaction on the at least one storage device using the storage controller concurrently.

18. The system of claim 14, wherein the first storage controller includes a controller cache and wherein the system is further operable to provide a completion response in response to caching a copy of the data transaction in the controller cache of the first storage controller.

19. The system of claim 18, wherein the system is further operable to initiate the performing of the data transaction without caching the data transaction on any storage controller of the system other than the first storage controller based on a field of the protected-mode data transaction, wherein the field is one of a SCSI group number field and a diagnostic field.

20. A non-transitory machine readable medium having stored thereon instructions for performing a method comprising machine executable code, which when executed by at least one machine, causes the machine to:

receive a data transaction from an initiator;

write the data transaction to a cache of a storage controller;

write a copy of the data transaction to a cache other than the cache of the storage controller after a transaction completion response is provided to the initiator;

provide a release response to the initiator releasing a copy of the data transaction from an initiator cache; and perform the data transaction on a storage device of the storage system.

21. The non-transitory machine readable medium of claim 20, wherein the release response is provided before the data transaction has completed on the storage device.

22. The non-transitory machine readable medium of claim 20 having stored thereon further instructions comprising machine executable code, which causes the machine to:

determine that the data transaction failed to complete; and recover the data transaction from the initiator cache.

23. The non-transitory machine readable medium of claim 20, wherein a group number field of the data transaction indicates that the initiator includes the initiator cache.

\* \* \* \* \*